United States Patent [19]

McMahon et al.

[11] Patent Number: 5,423,992

[45] Date of Patent: * Jun. 13, 1995

[54] CHEMICALLY DISINFECTED SEWAGE SLUDGE-CONTAINING MATERIALS

[75] Inventors: Matthew A. McMahon; Mitri S. Najjar, both of Wappingers Falls; Peter D. Robison, Poughkeepsie; Ronald J. McKeon, Beacon, all of N.Y.

[73] Assignee: Texaco Inc., White Plains, N.Y.

[ * ] Notice: The portion of the term of this patent subsequent to Jun. 8, 2010 has been disclaimed.

[21] Appl. No.: 702,580

[22] Filed: May 20, 1991

[51] Int. Cl.⁶ .......................... C02F 11/14; C02F 1/50
[52] U.S. Cl. ..................... 210/764; 210/766; 210/774; 48/197 R; 48/197 A; 48/209
[58] Field of Search .............. 44/605, 280–282; 48/197 R, 197 A, 198.1, 198.3, 206, 209, 210; 110/341, 342, 346–348; 210/609, 749, 761, 764, 769, 774, 765, 766

[56] References Cited

U.S. PATENT DOCUMENTS

| | | | |
|---|---|---|---|
| 4,793,927 | 12/1988 | Meehan et al. | 210/764 |
| 4,822,379 | 4/1989 | Thompson | 44/605 |
| 5,114,541 | 5/1992 | Bayer | 48/197 A |
| 5,217,625 | 6/1993 | Khan et al. | 210/761 |

*Primary Examiner*—Thomas Wyse
*Attorney, Agent, or Firm*—George J. Darsa; Kenneth R. Priem; Jeffrey M. Greenman

[57] ABSTRACT

A chemically disinfected sewage sludge-containing material comprising (1) an aqueous slurry of sewage sludge-containing material having a solids content in the range of about 10 to 30 wt. %; and (2) a chemical disinfectant comprising a water soluble silicate of sodium in the amount of 5 to 20 wt. % (basis dry wt. of said sewage sludge). In one embodiment, a pumpable chemically disinfected sewage sludge-containing material was produced by the steps of (1) dewatering sewage sludge to produce an aqueous slurry having a solids content of about 10 to 30 wt. %; (2) shearing the dewatered sewage sludge from (1) at a temperature in the range of about ambient to 230° F. and at a shear rate of at least 30 per second for a period in the range of about 0.5 to 180 minutes; and (3) mixing the following materials together at a temperature in the range of about ambient to 230° F. to produce a pumpable aqueous slurry having a solids content in the range of about 30 to 65 wt. % and a pH of at least about 11: (a) about 0.5 to 7 parts by wt. of sheared dewatered sewage sludge from (2); (b) about 5 to 20 wt. % of a silicate of sodium (basis total dry weight of sewage sludge); and (c) about 5 to 7 parts by wt. of at least one material from the group consisting of sewage sludge-containing material, liquid hydrocarbonaceous fuel, solid carbonaceous fuel-containing material, and mixtures thereof.

9 Claims, No Drawings

CHEMICALLY DISINFECTED SEWAGE SLUDGE-CONTAINING MATERIALS

FIELD OF THE INVENTION

This invention relates to chemically disinfected and thereby stabilized sewage sludge-containing materials.

DESCRIPTION OF RELATED ART

Sewage sludge may be gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention in which a silicate-containing chemical disinfectant is mixed with sewage sludge with or without liquid hydrocarbonaceous or solid carbonaceous fuel to produce a chemically disinfected feedstock for a partial oxidation gasifier. Microorganisms such as bacteria, viruses and fungi are thereby eliminated and stability of the sewage sludge-containing materials is improved.

SUMMARY OF THE INVENTION

A pumpable chemically disinfected sewage sludge-containing material comprising:
(1) an aqueous slurry of sewage sludge-containing material having a solids content in the range of about 10 to 30 wt. %; and
(2) a chemical disinfectant comprising a water soluble silicate of sodium in the amount of about 5 to 20 wt. % (basis dry wt. of said sewage sludge).

DESCRIPTION OF THE INVENTION

With landfills closing, ocean dumping being curtailed, and high-technology incinerators becoming unpopular in many areas, communities are finding that it is getting increasingly more difficult and expensive to dispose of their sewage sludge. Pumpable, chemically disinfected aqueous slurries of sewage sludge or mixtures of sewage sludge and solid carbonaceous fuel are made by the subject process containing high concentrations of sewage sludge. These pumpable slurries may be used as a fuel in a partial oxidation gas generator and may be thereby disposed of without contaminating the atmosphere. A nonpolluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace. A chemical disinfectant comprising a sodium and/or potassium silicate is included in the slurry fuels to eliminate viable microorganisms, improve stability, and to lower the melting point of slag by behaving as a fluxing agent.

It is necessary to collect and store large quantities of sewage sludge in order to have enough to fuel a large gasifier disposal unit for a sustained period of time. This would be easier to do if it were disinfected in some manner before shipping it to a centrally located facility. We have unexpectedly found that increasing the pH of sewage sludge to at least about 11 with a water soluble silicate of sodium effectively kills most of the organisms in sewage sludge. In one series of experiments, samples of raw sewage sludge from Los Angeles containing more that 500 million organisms per gram were treated with solutions containing one, five and 10% sodium metasilicate. The measured pH's of these slurries were 11.9, 12.3 and 12.7, respectively. In 2 days, more than 99% of the microorganisms in all three of these slurries had been killed, leaving an effectively sterile residue that could be stored without degrading. Such a stabilization procedure would enable sludge to be transported for long distances or stored for longer periods of time without decomposing, losing its heating value or changing its physical properties.

The water soluble silicate of sodium is selected from the group consisting of sodium metasilicate ($Na_2SiO_3$) anhydrous, sodium orthosilicate ($Na_4SiO_4$), sodium disilicate ($Na_2Si_2O_5$), and mixtures thereof. Hydrates of sodium silicate are also effective. For example, suitable hydrates of sodium silicate have the formula $Na_2SiO_3 n-H_2O$, wherein $n = 5, 6, 8$ and $9$. The water soluble silicate of sodium in the amount of about 5 to 20 wt. % (basis dry wt. of sewage sludge) is mixed with the sewage sludge to increase the pH of the mixtures to at least about 11.

The term "sewage sludge" as used herein may be broadly defined as "water-carried wastes", particularly from municipal sanitary sewage lines, containing at least one of the following: body wastes (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply.

Sewage sludge is obtained from raw sewage and may contain a number of pathogens known to be health hazards to humans. Almost any type of microorganism may be found in sewage, including bacteria, protozoans, viruses and fungi.

The biological stabilizing additives described herein disinfect and inactivate pathogens in sludge. Further, they increase the pH above about 11 where bacteria and viruses cannot survive. Unlike lime and other alkalizing agents, the chemical disinfectants described herein do not react with water in the sludge so as to render the sludge less pumpable and more difficult to feed to a gasifier. Further, unlike other sodium compounds, there is substantially no increase in sodium concentration in the gas phase resulting from burning the sludge in a gasifier. Accordingly, there is no damage to the refractory walls lining the partial oxidation gas generator.

The slurry of sewage sludge, optionally in admixture with supplemental carbonaceous fuel, may be reacted with a free oxygen-containing gas by partial oxidation in a free-flow non-catalytic gas generator. Noxious sewage sludge is safely disposed of by the subject process without polluting the nation's environment. Noncontaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed. This process has the following advantages:

(a) Noxious sewage or industrial sludge is disinfected and disposed of without polluting the environment, and clean fuel gas and/or synthesis gas is produced.
(b) By-product synthesis gas may be used in the catalytic synthesis of organic chemicals e.g. methanol.
(c) The slag produced during the partial oxidation of the mixed feed of sludge and solid carbonaceous fuel is free of pollutants, and is non-hazardous. Further, it is non-leachable.
(d) The process has a high thermal efficiency. Internally generated steam produced in a waste heat boiler may be used to heat the dewatered sewage sludge. The steam may be also used as the working fluid in an expansion turbine.

A typical ultimate analysis of sewage sludge is shown in Table I. A typical ultimate analysis of inert non-combustible materials in sewage sludge is shown in Table II. The higher heating value (BTU/lb) of dry sewage sludge is in the range of about 3000 to 7000.

TABLE I

TYPICAL ULTIMATE ANALYSIS OF COMBUSTIBLES IN SEWAGE SLUDGE

| ELEMENT | WT. % |
|---|---|
| CARBON | 54.6 |
| HYDROGEN | 7.9 |
| NITROGEN | 4.5 |
| OXYGEN | 32.0 |
| SULFUR | 1.0 |

TABLE II

TYPICAL ANALYSIS OF INERT NON-COMBUSTIBLE MATERIALS IN SEWAGE SLUDGE

| ELEMENT | MG/KG DRY SOLIDS |
|---|---|
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge containing about 20 to 50 wt. % of solids and liquid hydrocarbonaceous or solid carbonaceous fuel e.g. coal and/or petroleum coke that contain sufficient sewage sludge to be profitably burned are ordinarily too viscous to be pumped. This problem and others have been overcome by the subject invention.

Sewage sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19–50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, a pumpable aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The purified water may be then used subsequently in the process. For example, it may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat and thereby agglomerate the aqueous suspension of sewage sludge. Excess water may be discharged from the system or used externally for industrial applications. The sludge underflow from the primary sedimentation tank comprising primary sewage sludge or from the holding tank comprising primary sewage sludge in admixture with about 0 to 50 wt. % (basis total sewage sludge) of secondary sewage sludge is dewatered further to produce a thickened aqueous suspension.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

The dewatered pumpable aqueous slurry of sewage sludge having a solids content of about 10 to 30 wt. % may be pretreated by the following procedure to improve its slurrying characteristics and solids content: shearing the slurry of sewage sludge at a temperature in the range of about ambient to 230° F. and at a shear rate of at least 30 per second for a period in the range of about 0.5 to 180 minutes.

Shearing is a very effective way to improve the slurrying characteristics and solids content of dewatered sewage sludge having a solids content of about 10 to 30 wt. %. For example, a homogeneous pumpable slurry of sewage sludge having a viscosity of about 400 to 2,000 centipoise at 200° F. and a solids content in the range of greater than 10 to 30 wt. % may be produced by shearing the dewatered sewage sludge by means of a conventional shearing device at a temperature in the range of about ambient to 230° F. For example, the dewatered sewage sludge having a solids content in the range of about 10 to 30 wt. % may be sheared in a mixing vessel by means of a propeller-type agitator at a shear rate of at least 30 per second for a period of about 0.5 to 180 minutes. Heating and shearing of sewage sludge is treated in coassigned U.S. Pat. Nos. 4,933,086 and 4,983,296, which are incorporated herein by reference.

The profit that can be made from the subsequent burning of the pretreated sewage sludge is determined by the percentage of sewage sludge in the feed to the partial oxidation gasifier; or, alternatively in the feed to the furnace, boiler, or incinerator. Gasification of sewage sludge alone is not very efficient, as the heating value of sewage sludge is very low compared to other fuels such as coal. Mixing sewage sludge with liquid hydrocarbonaceous fuel or coal and/or petroleum coke improve the overall heating value of the slurry. Gasification of such mixtures are thereby rendered highly viable. Accordingly, the solids content of the pretreated aqueous slurry of sewage sludge is increased by mixing with it at least one of the following materials: sewage sludge-containing material and/or liquid hydrocarbonaceous fuel or a solid carbonaceous fuel-containing material. The sewage sludge-containing material is selected from the group consisting of dried sewage sludge having a solids content in the range of about 75 to 99 wt. %, aqueous slurry of sewage sludge having a solids content in the range of about 15 to 70 wt. %, and mixtures thereof. The solid carbonaceous fuel-containing material is an aqueous slurry of coal and/or petroleum coke having a solids content in the range of about 30 to 70 wt. %, dried coal and/or petroleum coke having a solids content in the range of about 75 to 100 wt. %, and mixtures thereof. The aforesaid sewage sludge-containing material and/or liquid hydrocarbonaceous fuel or solid carbonaceous fuel-containing material are mixed with the sheared dewatered sewage sludge and the silicate of sodium disinfectant to produce a pumpable aqueous slurry having a solids content in the range of greater than 30 to 70 wt. % and a pH of at least about 11. The parts by weight of supplemental solid carbonaceous fuel and/or liquid hydrocarbonaceous fuel to dewatered sewage sludge are respectively in the range of about 5-7 to 0.5-7, such as about 6:2.

The term liquid hydrocarbonaceous fuel as used herein is intended to include various liquid hydrocarbon materials, such as those selected from the group consisting of liquified petroleum gas, petroleum distillates and residues, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operation, furfural extract of coker gas oil and mixtures thereof. The term "coal" as used herein is intended to mean a material selected from the group consisting of anthracite, bituminous, lignite, residue derived from coal liquefaction, shale, asphalt, and mixtures thereof.

The dried sewage sludge is prepared by drying dewatered sewage sludge to a solids content in the range of about 75 to 99 wt. %. Advantageously, waste heat streams from downstream in the process may be used to dry the sewage sludge, such as steam produced in the gasifier waste heat boiler. The solid carbonaceous fuel-containing material has a solids content in the range of about 50 to 100 wt. % and may comprise dry solid fuels such as coal and/or petroleum coke, or aqueous slurries of coal and/or petroleum coke.

Alternatively all three ingredients may be simultaneously mixed together. The aforesaid mixing of the ingredients takes place at a temperature in the range of about ambient to 230° F. The term "and/or" is used herein in its normal sense. For example, "A and/or B" means either A, B, or A and B.

In a preferred embodiment, the fuel feedstream, for example the aqueous slurry of chemically disinfected sewage sludge and coal and/or petroleum coke and a stream of free-oxygen containing gas are introduced into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference.

The burner assembly is inserted downward through a top inlet port of the noncatalytic synthesis gas generator. The burner extends along the central longitudinal axis of the gas generator with the downstream end discharging a multi-phase mixture of fuel, free-oxygen containing gas, and temperature moderator directly into the reaction zone.

A three or four stream annular type burner, such as shown and described in coassigned U.S. Pat. Nos. 3,847,564 and 4,525,175, which are incorporated herein by reference, may be used to introduce the feedstreams into the partial oxidation gas generator. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e. greater than 21 mole % $O_2$, and air. The free-oxygen containing gas is supplied at a temperature in the range of about 100° F. to 1000° F. The aqueous slurry of chemically disinfected sewage sludge and coal and/or petroleum coke is passed through the intermediate annular passage 16 at a temperature in the range of about ambient to 650° F.

The weight ratio of $H_2O$ to carbon in the feed is in the range of about 0.2 to 3.0, such as about 1.0 to 2.0. The atomic ratio of free-oxygen to carbon in the feed is in the range of about 0.8 to 1.4, such as about 1.0 to 1.2. Advantageously, the high amount of combined oxygen in the sewage sludge reduces the amount of free-oxygen.

The relative proportions of solid or liquid fuels, water and oxygen in the feedstreams to the gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. Preferably the temperature in the gasifier is in the range of about 2200° F. to 2800° F., so that molten slag is produced. Advantageously, the water soluble silicate of sodium disinfecting agent will scavenge any volatile sodium and thereby protect the refractory lining of the gasifier from attack. The life of the refractory lining is extended at a substantial economic savings. Further, the silicate additive behaves as a fluxing agent to lower the melting point of the slag.

The dwell time in the reaction zone is in the range of about 1 to 10 seconds, and preferably in the range of about 2 to 8 seconds. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, 1 $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce stream in gas cooler. The gas stream may be cleaned and purified by conventional methods. For example, reference is made to coassigned U.S. Pat. No. 4,052,176, which is included herein by reference for removal of $H_2S$, COS, and $CO_2$.

Although modifications and variations of the invention may be made without departing from the spirit and scope thereof, only such limitations should be imposed as are indicated in the appended claims.

We claim:

1. A pumpable chemically disinfected sewage sludge-containing material consisting essentially of:
   (1) an aqueous slurry of sewage sludge-containing material having a solids content in the range of about 10 to 30 wt. %; and
   (2) a chemical disinfectant comprising a water soluble silicate of sodium in the amount of 5 to 20 wt. % (basis dry wt. of said sewage sludge).

2. The chemically disinfected sewage sludge-containing material of claim 1 wherein said water soluble silicate of sodium is selected from the group consisting of sodium metasilicate anhydrous, sodium orthosilicate, sodium disilicate and mixtures thereof.

3. The chemically disinfected sewage sludge-containing material of claim 1, wherein the silicate of sodium is in the form of a hydrate.

4. The chemically disinfected sewage sludge-containing material of claim 3 wherein said hydrate has the formula $Na_2HSiO_4 \cdot nH_2O$, wherein said n=5, 6, 8 and 9.

5. A process for producing chemically disinfected sewage sludge having a pH of 11 or higher comprising mixing with an aqueous slurry of sewage sludge having a solids content in the range of about 10 to 30 wt. % at a temperature in the range of about ambient to 200° F. about 5 to 20 wt. % (basis dry wt. of said sewage sludge) of a silicate of sodium.

6. A process for producing a pumpable chemically disinfected sewage sludge-containing material comprising:
   (1) dewatering sewage sludge to produce an aqueous slurry having a solids content of about 10 to 30 wt. %;
   (2) shearing the dewatered sewage sludge from (1) at a temperature in the range of about ambient to 230° F. and at a shear rate of at least 30 per second for a period in the range of about 0.5 to 180 minutes;
   (3) mixing the following materials together at a temperature in the range of about ambient to 230° F. to produce a pumpable aqueous slurry having a solids content in the range of about 30 to 70 wt. % and a pH of at least about 11:
      a. about 0.5 to 7 parts by wt. of sheared dewatered sewage sludge from (2);
      b. about 5 to 20 wt. % of a silicate of sodium (basis total dry weight of sewage sludge); and
      c. about 5 to 7 parts by wt. of at least one material from the group consisting of sewage sludge-containing material, liquid hydrocarbonaceous fuel, solid carbonaceous fuel-containing material, and mixtures thereof.

7. The process of claim 6, wherein said water soluble silicate of sodium is selected from the group consisting of sodium metasilicate anhydrous, sodium orthosilicate, sodium disilicate and mixtures thereof.

8. The process of claim 6, wherein the silicate of sodium is in the form of a hydrate.

9. The process of claim 6, wherein said hydrate has the formula $Na_2HSiO_4 \cdot nH_2O$, wherein n=5, 6, 8 and 9.

* * * * *